(12) United States Patent
Kinnari et al.

(10) Patent No.: US 8,705,949 B2
(45) Date of Patent: Apr. 22, 2014

(54) METHOD AND SYSTEM FOR DIRECT ELECTRIC HEATING OF A PIPELINE

(75) Inventors: Keijo J. Kinnari, Myklaberglia (NO); Kjell Morisbak Lund, Stavanger (NO); Atle Harald Børnes, Fyllingsdalen (NO); Catherine Labes-Carrier, Hafrsfjord (NO)

(73) Assignee: Statoil Petroleum AS, Stavanger (NO)

( * ) Notice: Subject to any disclaimer, the term of this patent is extended or adjusted under 35 U.S.C. 154(b) by 1677 days.

(21) Appl. No.: 10/561,151

(22) PCT Filed: Jun. 17, 2004

(86) PCT No.: PCT/NO2004/000177
§ 371 (c)(1),
(2), (4) Date: Sep. 25, 2006

(87) PCT Pub. No.: WO2004/111519
PCT Pub. Date: Dec. 23, 2004

(65) Prior Publication Data
US 2007/0098375 A1    May 3, 2007

(30) Foreign Application Priority Data
Jun. 18, 2003   (NO) .................................... 20032775

(51) Int. Cl.
*E21B 7/15* (2006.01)
*E21B 43/00* (2006.01)

(52) U.S. Cl.
USPC ............................................ 392/301; 166/248

(58) Field of Classification Search
USPC ........ 392/301–306; 166/248, 57, 60, 61, 268, 166/270, 270.1, 400–402
See application file for complete search history.

(56) References Cited

U.S. PATENT DOCUMENTS

| 6,328,583 | B2 * | 12/2001 | Ness et al. | 439/193 |
| 2002/0028070 | A1 * | 3/2002 | Holen | 392/478 |
| 2003/0178195 | A1 * | 9/2003 | Agee et al. | 166/248 |
| 2004/0253734 | A1 * | 12/2004 | Firmin | 436/28 |

* cited by examiner

Primary Examiner — Sang Y Paik
(74) Attorney, Agent, or Firm — Wenderoth, Lind & Ponack, LLP

(57) ABSTRACT

Method and system for direct electric heating of a pipeline to contribute to removal or hindrance of plugs of ice and optionally hydrates, distinguished in that heating takes place to a temperature above the ice melting point, but below the hydrate melting point.

5 Claims, 1 Drawing Sheet

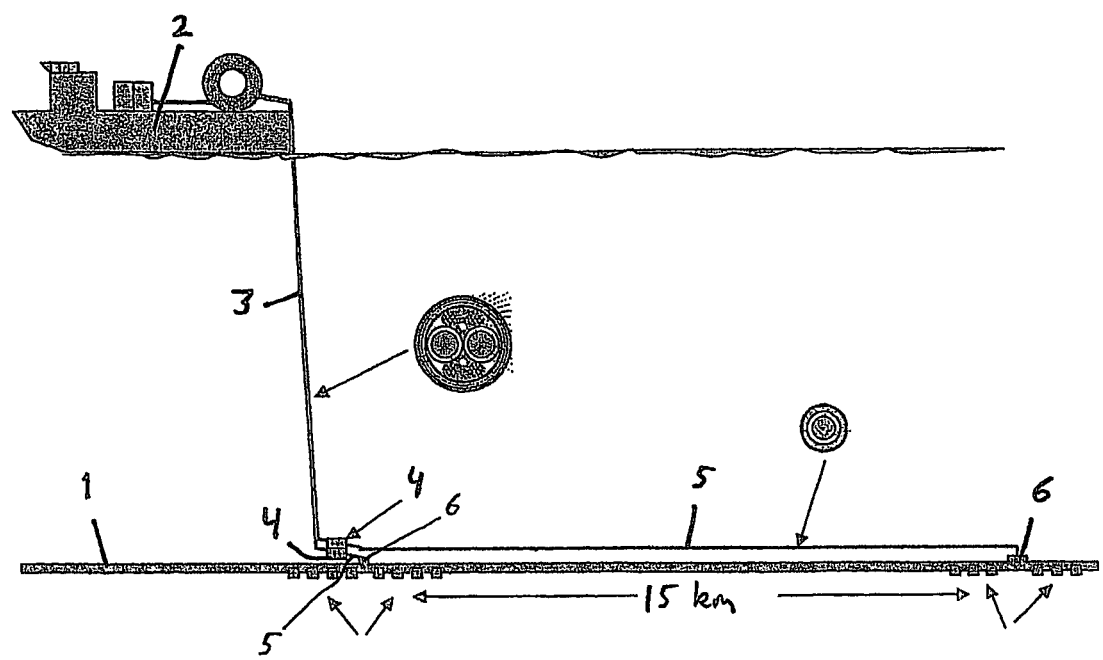

METHOD AND SYSTEM FOR DIRECT ELECTRIC HEATING OF A PIPELINE

FIELD OF THE INVENTION

The present invention relates to removal of hydrates and ice from pipelines, in particular pipelines that conduct hydrocarbons, such that the flow of hydrocarbons is not blocked. More particularly the present invention relates to a novel method and a novel system for removal of ice or hindrance of ice formation in a pipeline, such that the pipe flow can be maintained or provided by conventional methods for hydrate and ice removal. The method and the system according to the invention are particularly advantageous for pipelines for which it is difficult to use traditional methods for plug removal, such as in deep water, and pipelines that to a smaller degree are isolated. The invention is also relevant for water conducting pipelines, such as pipelines for water injection.

BACKGROUND OF THE INVENTION AND PRIOR ART

With respect to transport of hydrocarbons through pipelines it is a known problem that the flow of hydrocarbons can be blocked by hydrates and/or ice, the whole cross-section can be blocked by formation of so called hydrate plugs and/or ice plugs. The commonly used method to avoid plugging by hydrates and/or ice in pipelines is to add chemicals to the hydrocarbon flow, which chemicals affect the equilibrium conditions for hydrates and/or ice. The most commonly used chemicals in that respect are methanol and glycols.

To remove hydrate plugs in pipelines it is known to depressurize, as reduced pressure results in a reduction of the hydrate melting temperature, such that hydrates that are formed can melt. However, it is known that the depressurization must be undertaken carefully since ice easily can be formed by said depressurization, such that ice instead of or in addition to the hydrates can block the hydrocarbon flow in the pipeline.

To avoid the above mentioned plugging problems with hydrates and ice it is known to perform direct electric heating of pipelines to maintain the temperature over the equilibrium temperature for hydrate formation and ice formation, respectively, such that hydrates and ice can be avoided. Direct electric heating (DEO) is based on the fundamental principle that electric current in a metallic conductor generates heat due to ohmic loss. Electric cables are connected to the pipeline such that an electric circuit including the pipeline is formed. When formation of hydrates and ice can be expected, the DEO system is set in operation, which takes place by impressing electric alternating current in the electric circuit in which the pipeline is included.

In the Norwegian sector of the North Sea systems have been installed for direct electric heating on six transport pipelines (10", lengths 6.0-8.5 km) connected to the field Åsgard B and to the condensate pipelines (8", length 16 km) between the fields Huldra and Veslefrikk. Additionally, for the Kristin field systems have been developed for direct electric heating of six transport pipelines (10", lengths 6.0-6.7 km). All systems that have been installed have power from the platform infrastructure close to the pipeline systems. The systems for direct electric heating at Åsgard have been commissioned, but no operational experience is so far achieved. However, the systems for direct electric heating on Huldra were set into operation in 2002 and function according to design. The system for direct electric heating on Kristin is planned to be in operation in 2005.

The system for direct electric heating on Huldra has a working voltage of 6.0 kV, and all cables are designed for a voltage $U_0/U$ $(U_M)$ of 12/20 (24) kV.

However, it has proved to be unduly expensive and comprehensive to implement direct electric heating for pipelines that are situated at large depth or has a smaller degree of thermal isolation, which represents a significant problem.

Therefore a demand exists for a method and a system for direct electric heating for which the above mentioned problem to a large degree is reduced.

SUMMARY OF THE INVENTION

With the present invention a method is provided for direct electric heating of a pipeline to contribute to removal or absence of plugs of ice and optionally hydrates, distinguished in that the heating takes place to a temperature above the melting point for ice, but below the melting point for hydrates. With the present invention a system is also provided, which is particularly beneficial for utilization with the method, which system has design and distinguishing features as apparent from claim 3.

DRAWING

The present invention is illustrated with a drawing, more particularly

FIG. 1 that illustrates a system for direct electric heating according to the present invention.

DETAILED DESCRIPTION

Reference is made to FIG. 1 that illustrates a general system for direct electric heating according to the present invention. More particularly the system is implemented on a subsea pipeline 1. The system comprises a surface vessel 2, having capacity for handling cables and other equipment as required and delivery of required power to the electric heating. Down from the surface vessel 2 through the sea hangs a riser cable 3 that is used to conduct the power between the surface vessel and the subsea pipeline. In the lower end of the riser cable two connections 4 have been provided, which can be connected or disconnected subsea. Each of the connections 4 are further connected to a cable 5 for direct electric heating (DEO-cable), which DEO cables in the other end are connected via connections 6 to the pipeline. A current circuit is formed by passing current from the surface vessel down through one part of the riser cable 3, through one subsea connection 4, through one DEO-cable 5, through one connection 6 to the pipeline 1, through the pipeline the distance between the two connections 6, back from the pipeline to the other connection 6 and through the other DEO-cable, further through the other subsea connection and up to the surface vessel through the other part of the riser cable. By passing current through said circuit it is achieved that the pipeline is resistance heated in the section between the connections 6.

With respect to the direct electric heating in the pipeline it is preferable with as much outer thermal isolation on the pipeline as possible, such that the heat loss to the surrounding sea is reduced. As introductorily indicated the direct electric heating is very demanding with respect to equipment and costs, for which reason the present invention results in significant savings. A quantification of the savings must be made in each situation, because of substantial variations in heat loss and required equipment investments. The present invention is intended worked together with chemical injection and depressurization. Neither chemical injection nor depressurization will function if the hydrate plugs and/or ice plugs have low or no permeability, for which situation the present invention is worked. The depressurization will fail when the pressure cannot be relived to below the equilibrium pressure for hydrate formation at the ambient temperature, or the depressurization results in formation of ice plugs. Heating of the pipeline contents by direct electric heating to above the ice melting point will remedy the situation. As the temperature increases the ice is melted closest to the pipeline wall, the permeability increases, such that chemical injection and depressurization become possible. It is assumed to be sufficient for the system for direct electric heating to melt ice in a thin zone closest to the pipeline wall, such that the functionality for chemical injection and depressurization is re-established. The thickness of said zone will depend on the time for melting. It is not required to melt the whole ice plug, as it is sufficient to achieve flow over the plug. An estimated feasible dimensioning criterion is that the zone has thickness of 5 mm, however, other thicknesses can be chosen as dimensioning criterion, and the period of time for melting can be set as a dimensioning criterion.

Different from previous systems and methods, the dimensioning is such that only a part of the ice can be melted, since this is found to be sufficient to have the remaining ice and hydrates removed by conventional methods such as chemical injection and depressurization, in addition to that incipient flow will result in that ice and hydrates are broken up and carried away with the flow.

It is particularly with respect to shut down of the pipeline flow that ice and hydrate formation will be a problem, because the temperature will decrease to ambient temperature. The method according to the invention can preferably be worked in a sufficient time period before start-up of the pipe flow, or it can be worked under the whole shut down period such that formation of ice is avoided. The method preferably comprises that the heating takes place such that a zone of ice having thickness of at least 5 mm closest to the inner wall of the pipeline will melt, such that the permeability through the pipeline is reassumed or maintained, such that chemical injection and depressurization become feasible techniques for plug removal or hindrance of plug formation of ice and hydrates.

The system for direct electric heating preferably comprises a vessel with means having capacity for delivery of sufficient current and handling of the riser cable to extend this down through the sea to the pipeline for subsea connection to DEO-cables that preferably are preinstalled and connected to the pipeline.

EXAMPLE

On the 15 km closest to the field Ormen Lange in the Norwegian sector of the North Sea, having two 30" pipelines, normal ambient temperature is −2° C. in the coldest period of the year. To melt a 5 mm thick ice layer from the inner wall of a pipeline, the system and the method according to the invention must have capacity as follows:

System current: 1700 A
Supply voltage: 8.5 kV
Power requirement: 3.9 MW

Two cable conductors for direct electric heating (DEO-cables), each having cross section of 1000 $mm^2$, are required.

A riser cable (DEO-riser cable) having conductor cross section 2×1600 $mm^2$ is estimated to be feasible.

With a coating thickness of 8 mm on the pipelines on Ormen Lange a period of heating of 50 hours is required to heat the ice-plug from −2° C. to 1° C. and melt the outer 5 mm thick layer, over the length of 15 km, on one pipeline.

The invention claimed is:

1. A method for removing plugs of at least ice in a subsea pipeline, which is electrically conductive, exhibits ohmic resistance, and is a conduit for a fluid, the method comprising:
   directly heating the pipeline electrically to a temperature above the melting point of ice, but below the melting point of a hydrate;
   applying an electrical voltage over the pipeline between two electrical contacts, thereby causing an electric current to pass through the pipeline to resume or maintain flow of fluid through the pipeline; and
   subsequently applying a second plug-counteracting procedure to remove any ice or hydrate plug from within the pipeline.

2. A method according to claim 1, further comprising applying the electrical voltage over the pipeline between the electrical contacts until a zone of ice having a thickness of at least 5 mm closest to an inner wall of the pipeline melts, such that flow of the fluid through the pipeline is resumed or maintained.

3. A method as in claim 1, in which the second plug-counteracting procedure is chemical injection.

4. A method as in claim 1, in which the second plug-counteracting procedure is depressurization.

5. A method according to claim 1, wherein the electrical voltage applied over the pipeline between the electrical contacts is sufficient to melt only part of the ice plug closest to an inner wall of the pipeline, the part of the ice plug forming a zone having a thickness of at least 5 mm closest to the inner wall of the pipeline to allow the flow of the fluid through the pipeline to be resumed or maintained.

* * * * *